(12) United States Patent
Sever et al.

(10) Patent No.: US 7,890,954 B2
(45) Date of Patent: Feb. 15, 2011

(54) METHOD AND SYSTEM FOR COMMUNICATING BETWEEN APPLICATION SOFTWARE

(75) Inventors: Aziz Sever, Istanbul (TR); Erhan Lokman, Istanbul (TR); Altug Simsek, Istanbul (TR); Can Ozumuztoprak, Istanbul (TR); Cemalettin Bora Eliacik, Istanbul (TR)

(73) Assignee: Argela Technologies (TR)

( * ) Notice: Subject to any disclaimer, the term of this patent is extended or adjusted under 35 U.S.C. 154(b) by 1817 days.

(21) Appl. No.: 10/905,237

(22) Filed: Dec. 22, 2004

(65) Prior Publication Data

US 2006/0136931 A1 Jun. 22, 2006

(51) Int. Cl.
*G06F 3/00* (2006.01)
(52) U.S. Cl. ........................ 719/313; 719/314
(58) Field of Classification Search ............... 719/314
See application file for complete search history.

(56) References Cited

U.S. PATENT DOCUMENTS

| | | | |
|---|---|---|---|
| 5,634,010 A * | 5/1997 | Ciscon et al. ............... 709/223 |
| 6,009,266 A * | 12/1999 | Brownell et al. ............ 719/315 |
| 6,898,791 B1 * | 5/2005 | Chandy et al. .............. 719/314 |
| 6,967,956 B1 * | 11/2005 | Tinsley et al. ............... 370/466 |
| 7,159,111 B1 * | 1/2007 | Ganapathy ................... 713/167 |
| 2003/0182464 A1 * | 9/2003 | Hamilton et al. ............ 709/314 |

OTHER PUBLICATIONS

Joachim Charzinski, IP Based Networks and Applications, 2003.*

* cited by examiner

*Primary Examiner*—Lechi Truong
(74) *Attorney, Agent, or Firm*—IP Authority, LLC; Ramraj Soundararajan

(57) ABSTRACT

A system and method for communicating across multiple heterogeneous hosts using a two-tier software infrastructure where messaging software is used to handle all intra- and inter-host messaging and application software is divided into functional blocks called software entities where these entities communicate with one another through the messaging software. The messaging software communicates with other hosts using TCP/IP connection, where information about the registered entities such as location and state are communicated using a routing protocol such as RIP. This framework provides a new means of communication between functionally well-separated software components.

12 Claims, 5 Drawing Sheets

FIGURE 1 - PRIOR ART

METHOD AND SYSTEM FOR COMMUNICATING BETWEEN APPLICATION SOFTWARE

BACKGROUND OF THE INVENTION

The present invention relates generally to the field of building scalable software systems. More specifically, the present invention is related to software components distributed across multiple hosts in a large scale software system.

DISCUSSION OF PRIOR ART

According to its official definition, CORBA, standing for Common Object Request Broker Architecture, is Object Management Group's (OMG) open, vendor-independent architecture and infrastructure that computer applications use to work together over networks. Using the standard protocol IIOP, a CORBA-based program from any vendor, on almost any computer, operating system, programming language, and network, can interoperate with a CORBA-based program from the same or another vendor, on almost any other computer, operating system, programming language, and network.

With reference to FIG. 1, CORBA applications 101 and 104 are composed of objects, i.e., individual units of running software that combine functionality and data, and frequently (but not always) represent something in the real world.

For each object type, an ORB (Object Request Broker) interface 105 in OMG Interface Definition Language (IDL) is defined. The interface is the syntax part of the contract that the server object offers to the clients that invoke it. Any client that wants to invoke an operation on the object uses this IDL interface 102 to specify the operation it wants to perform, and to marshal the arguments that it sends. When the invocation reaches the target object, the same interface definition 103 is used there to unmarshal the arguments so that the object can perform the requested operation with them. The interface definition is then used to marshal the results for their trip back, and to unmarshal them when they reach their destination.

The IDL interface definition is independent of programming language, but maps to all of the popular programming languages via OMG standards: OMG has standardized mappings from IDL to C, C++, Java, COBOL, Smalltalk, Ada, Lisp, Python, and IDLscript.

CORBA is an industry standard due to the advantages mentioned above. It supports both distribution and object orientation. Services using CORBA can be written in many different languages, executed on many different platforms, and accessed by any language with an IDL mapping. It is ideally suited to use with legacy systems, and to ensure that applications written now will be accessible in the future.

On the other hand, different ORB implementations may be incompatible, which defeats the interoperability goal. Application source is not 100 percent portable between different CORBA products. Maintainability of underlying CORBA software is a real issue. One upgraded ORB may not work with other ORBs. It is difficult for non-experts to program the IDL interface; therefore language mapping tools create code stubs based on the interface. Some tools may not integrate new changes with existing code. Moreover, CORBA does not provide its user with lifecycle management capability, load sharing features, and redundancy. All those must be implemented independently within each CORBA application.

Whatever the precise merits, features, and advantages of the above discussed distribution system, it does not achieve or fulfill the purposes of the present invention.

SUMMARY OF THE INVENTION

The present invention provides a system and method for communicating across multiple heterogeneous hosts using a software system comprising two components: an application software component divided into functional blocks called software entities and a messaging software component used to handle all intra- and inter-host messaging between software entities. The messaging software communicates with other hosts using a TCP/IP (Transmission Control Protocol/Internet Protocol) connection, where information about the registered entities such as location and state are communicated using a routing protocol such as RIP.

DESCRIPTION OF THE PREFERRED EMBODIMENTS

Figure 1:
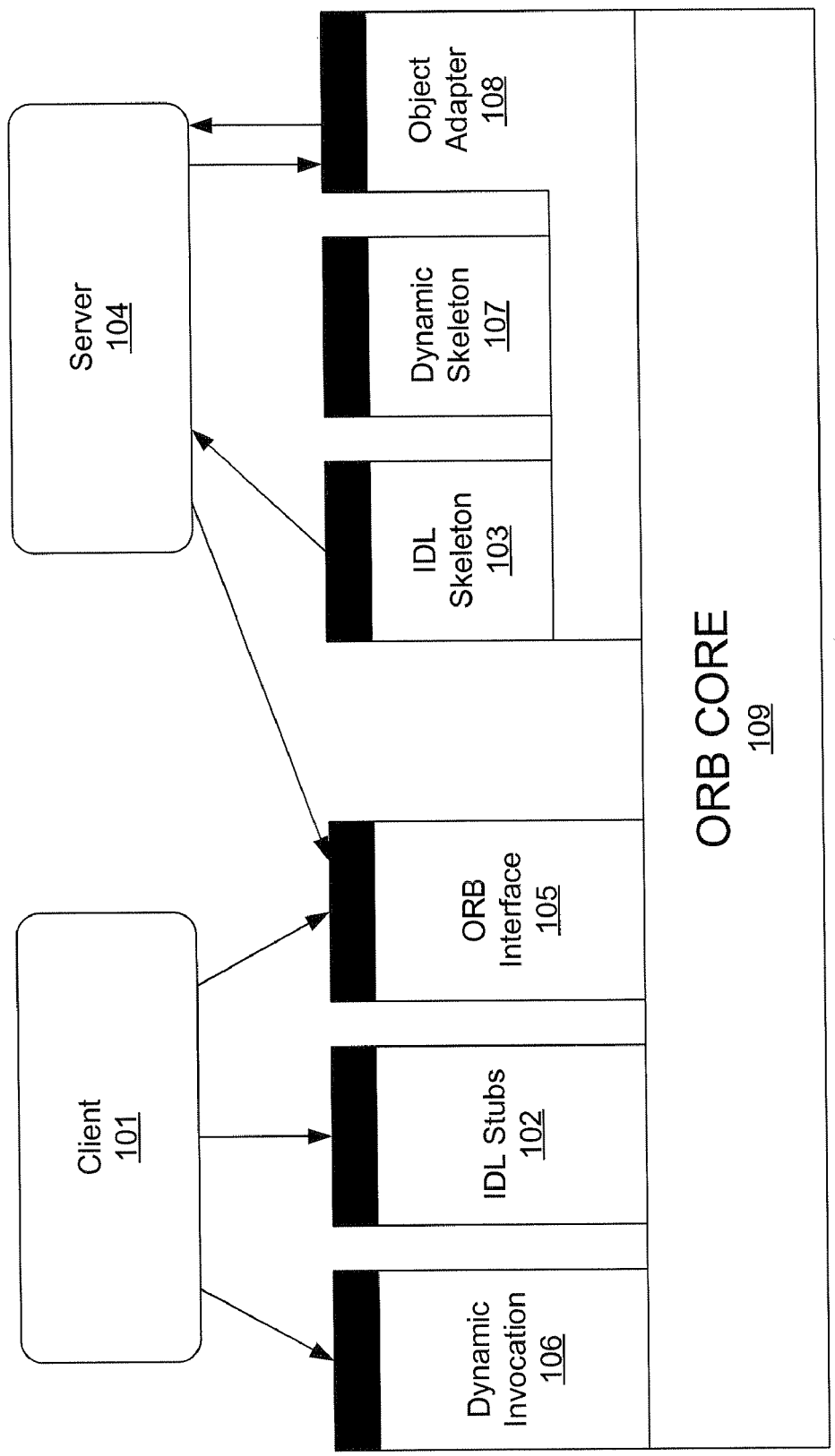
FIG. 1 illustrates prior art on how CORBA works for building a large scale software system.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
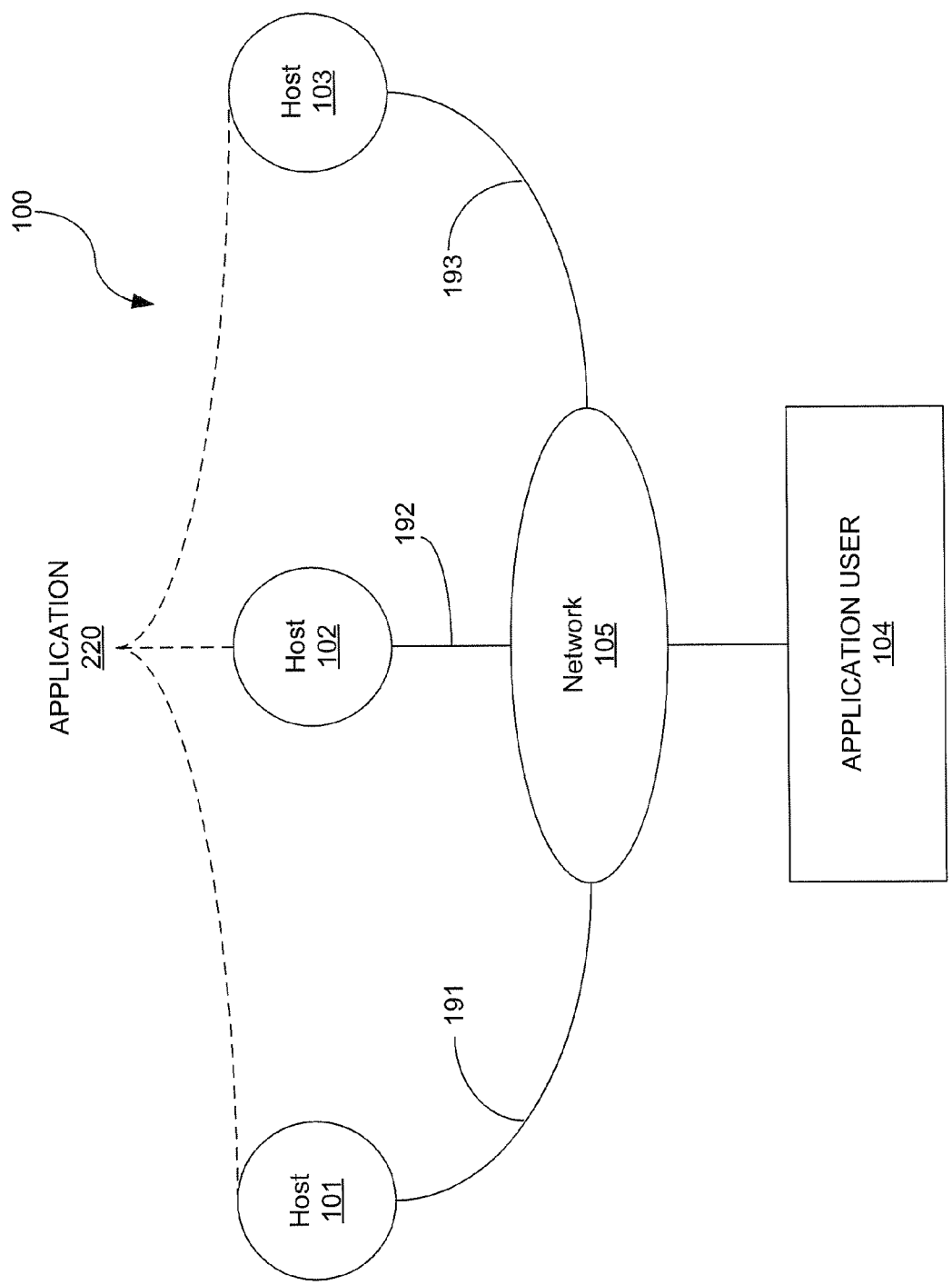
FIG. 2 illustrates a simplified block diagram of an exemplary software system distributed across multiple hosts.

With reference to FIG. 2, an exemplary embodiment of a distributed software system 100 is shown in which host 101, host 102, and host 103 are interconnected through network 105 and handle application software 220. Hosts 101, 102, and 103 connect to network 105 through physical links 191, 192, and 193, respectively. The requests of application user 104 can be serviced through the system on host 101, 102, or 103. In this configuration, all or some of the components of application software 220 may be replicated across these hosts which may be heterogeneous.

Figure 3:
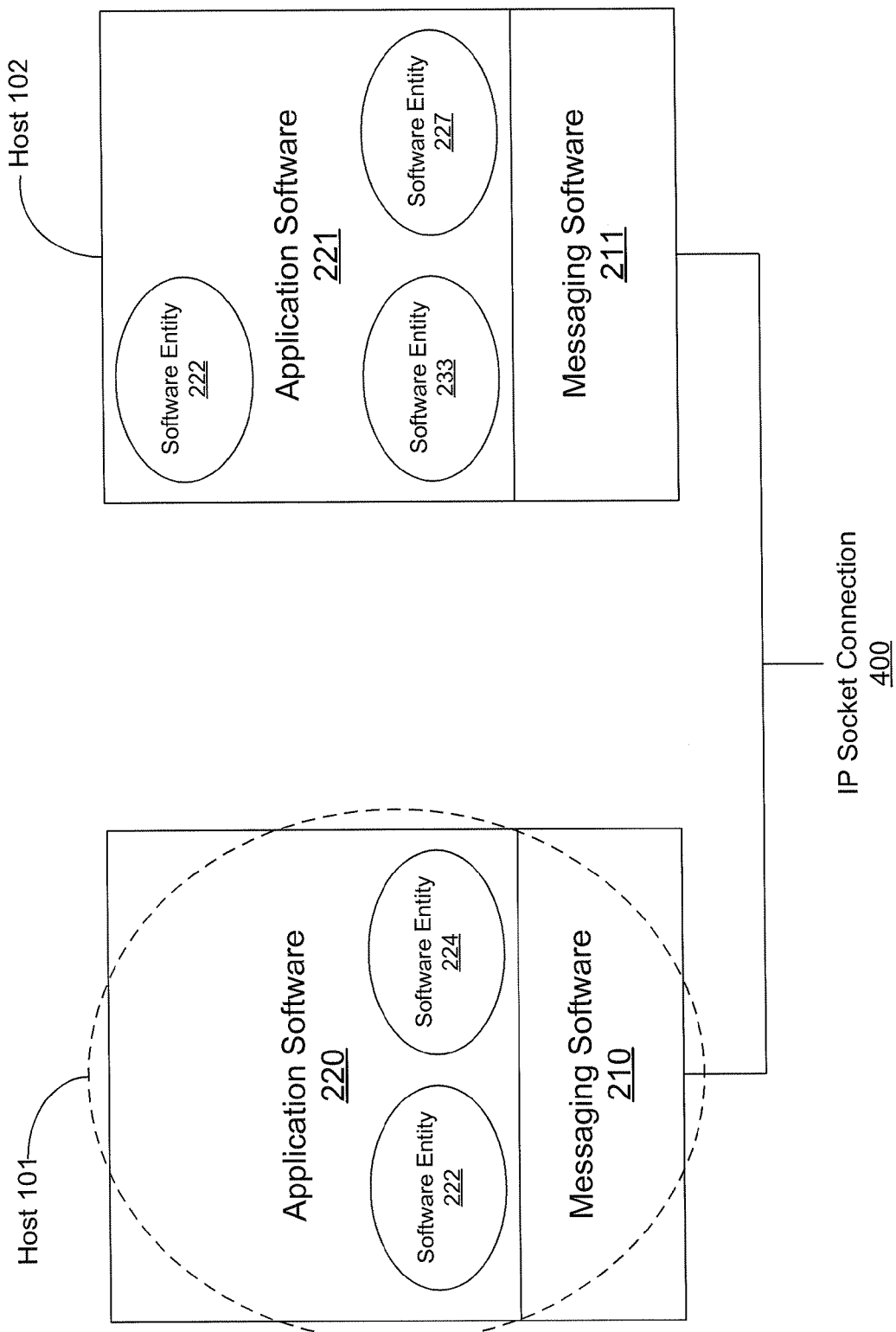
FIG. 3 illustrates a block diagram of system components of the exemplary software system.

For implementation of a service defined by the product specification provided by a customer, the service is divided into a plurality of functional blocks called software entities (SE) that perform well defined tasks. FIG. 3 shows a more detailed view of a service implementation running on two hosts 101 and 102. The software system on host 101 has two components: messaging software (MS) 210 and application software (AS) 220. Application software 220 is further subdivided into software entities 222 and 224. Similarly, the software system on host 102 is subdivided into two components: messaging software 211 and application software 221. Application software 221 is further subdivided into software entities 222, 227, 233. Application softwares 220, 221 may be similar to each other or disparate. Software entities may perform application specific tasks or application unrelated tasks. Application unrelated tasks are tasks that are independent of application softwares 220, 221 running on hosts 101, 102. Thus, both the hosts may have common software entities, for example, in FIG. 3, software entity (SE) 222 resides on both hosts. These software entities residing in hosts 101, 102 communicate with one another through the messaging software 210 and 211 to implement a service. The messaging software provides both external and internal messaging between software entities. The messaging software provides for external communication between the hosts 101 and 102 using IP socket connection 400, for example TCP/IP socket connection, wherein information about the registered entities such as location and state are communicated as messages using a routing protocol such as RIP. Even though the RIP protocol is used as an example messaging routing protocol, other routing protocols, such as open shortest path forwarding (OSPF), that are capable of communicating via messages sent from one host to another and dynamically creating routing tables are also envisioned. Many technologies are available for inter-process communications such as shared memory usage and sockets. In the preferred embodiment, shared memory is used for inter-process-communication between software entities residing on the same host (i.e. internal messaging). Throughout the specification, inter-process shared memory is used to indicate shared memory usage for inter-process communications. This framework is named: messaging and distribution framework (MAD), which provides a new means of communication between functionally well-separated software components and is designed to overcome restrictions imposed by other software distribution and messaging mechanisms, such as RMI and CORBA.

As an example, a voice mail service can be implemented where a user leaves messages for a customer and the customer accesses these messages by dialing into the service provider using a prepaid calling card. Whenever, the customer accesses a message, he is charged a fee that is deducted from the total amount in the prepaid calling card. Thus to implement this service, the service can be divided into a calling card application running on a first host and a voice messaging application running on a second host. The prepaid calling card application is further divided into two sets of software entities. The application unrelated entities are alarm entity, command line interface entity, configuration server entity, timer manager entity, load sharing entity and license server entity. Application specific entities are prepaid card core logic entity, SS7 TCAP signaling entity, SS7 INAP signaling entity and call detailed record entity. Similarly, the voice messaging application is also divided into two sets of software entities. The application unrelated entities are alarm entity, command line interface entity, configuration server entity, timer manager entity, load sharing entity and license server entity. Application specific entities are voice messaging core logic entity, SIP signaling entity, SIP proxy entity, voice recorder entity and announce player entity. The application unrelated entities are thus common for both the applications and may reside on either both the hosts or only on the first host and shared by the second host. The voice messaging entity on the second host deducts money from the customer account by communicating with the prepaid card entity on first host.

MAD brings a combination of useful features of other distribution mechanisms. Since there are many kinds of programming languages, Java and C/C++ being the most popular, MAD addresses the communications between software entities written in different programming languages. Furthermore, those software entities may be running on heterogeneous hardware platforms, e.g., some may be running on a PC whereas others may be running on a Sun workstation. This heterogeneity causes byte-ordering problems when two software entities on different platforms want to communicate with one another. This issue is solved in MAD by means of a simple, yet efficient, interface description language (IDL). The messaging interface between each software entity is first defined in the IDL and the encode/decode functions are automatically generated. The data structures and encoding are kept simple for superior performance when compared to other notation technologies such as ASN.1. This also helps to keep track of the software development process and ensure overall architecture quality.

MAD not only provides software entities with a hardware platform and programming language independent messaging capability, but also implements dynamic software entity discovery, status tracking, and reporting; traffic load sharing between same type of entities; and seamless redundancy in case of entity failures. The MAD framework may also be envisioned as two applications running on virtual servers on a single host.

Discussed below are the startup, registration, lifecycle management, and servicing mechanisms of the messaging framework.

COLD STARTUP: When hosts 101 and 102 are activated and application software 220 is running on them, each host sends to the other host an RIP message indicating its status. A list of all entities known to the host including entities registered and learned from the RIP messages is constructed. This list is then sent to all other hosts in MAD using the RIP protocol.

HOST DISCOVERY: Deletion and insertion of hosts in MAD is detected using a hello protocol that runs on the TCP/IP connection.

Figure 4:
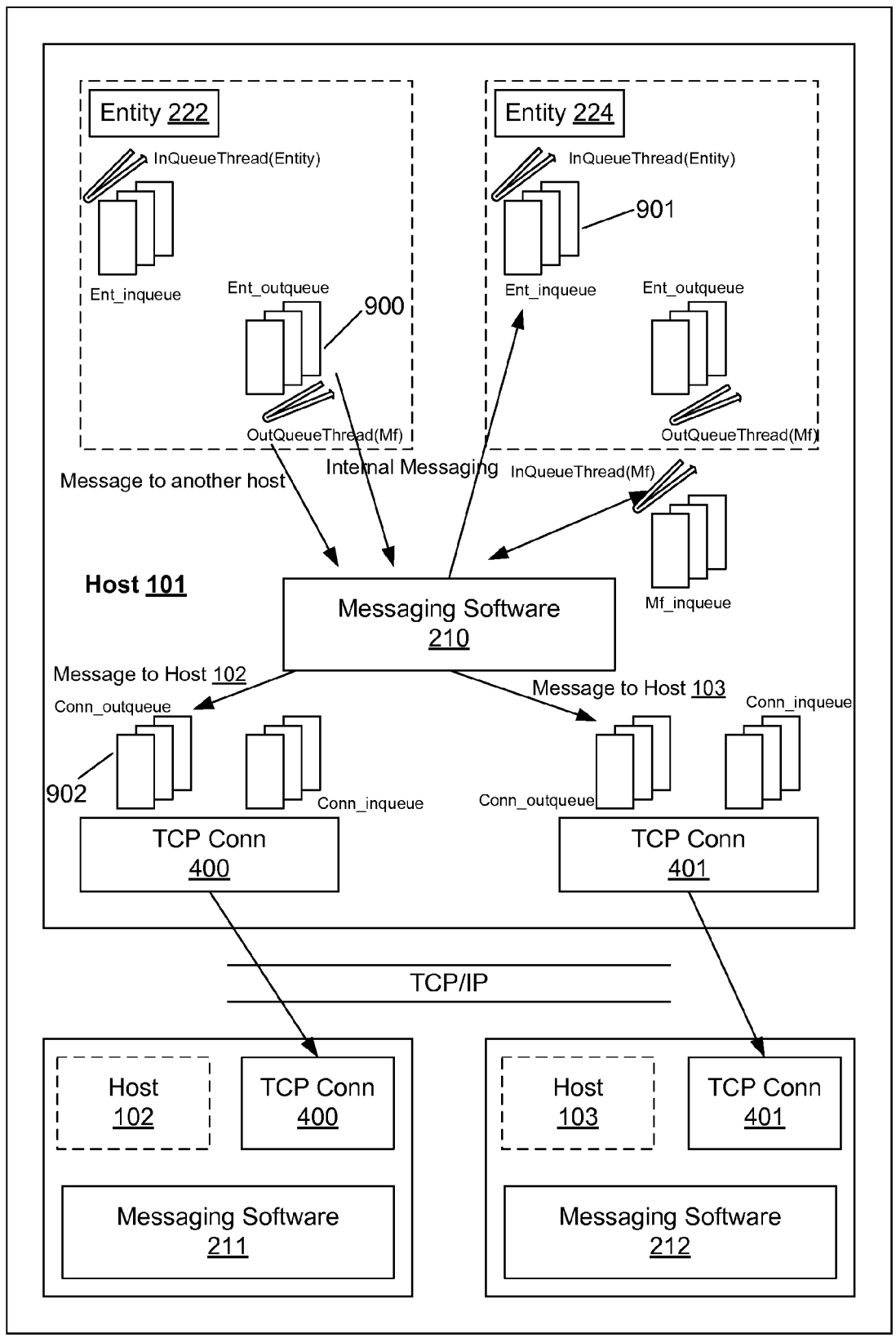
FIG. 4 illustrates a block diagram of an exemplary embodiment of the present invention.

REGISTRATION: Every MAD host is responsible for keeping track of the health and presence status of the software entities running on it. When an entity starts running on a host, the first thing for it to do is to register itself to MAD. Referring to FIG. 4, at system startup, SE 222 and 224 register with MS 210. The registered software entity's input and output message queues are established in the inter-process shared memory of the host and traffic dispatcher threads are created. MS 210 generates a routing information protocol (RIP) packet destined to MS 211 which contains information about SE 222 and SE 224 being registered. Simultaneously, MS 211 receives registry messages from SE 222, 227, and 233, and generates a RIP packet destined to MS 210 which contains information about SE 222, 227, and 233. The registry messages are distributed periodically among hosts using the TCP/IP connection. Upon exchanging these messages, MS 210 and MS 211 generate routing tables for different software entities as follows:

TABLE 1

Entity routing table for MS 210

| Software Entity ID | Location of Entity | Service State of Entity |
|---|---|---|
| SE 222 | Local and on Host 102 | Idle |
| SE 224 | Local | Idle |
| SE 227 | On Host 102 | Idle |
| SE 233 | On Host 102 | Idle |

TABLE 2

Entity routing table for MS 211

| Software Entity ID | Location of Entity | Service State of Entity |
|---|---|---|
| SE 222 | Local and on Host 101 | Idle |
| SE 224 | On Host 101 | Idle |
| SE 227 | Local | Idle |
| SE 233 | Local | Idle |

There may be many object instances of each entity implemented on each host. Doing so, the messages destined to an entity can be dispatched across many object instances of that entity to allow parallel processing of messaging requests. This implementation is obvious for those who understand basic object oriented programming principles.

The routing tables shown in Tables 1 and 2 may further include "hop counts" when there are more than two hosts. In case there are more than two hosts in the system, software entities on a first host can be reached by using a direct TCP/IP connection between itself and the other hosts. Alternatively, the first host can be reached using an indirect connection, i.e. a hop (alternate route included in routing table). For example, messages from host 101 to host 103, first go from host 101 to host 102 and then from host 102 to host 103. Thus, host 102 introduces an intermediary hop. The alternate routes are useful when the direct link between any pair of host is congested or out of service.

LIFECYCLE MANAGEMENT: MS 210 and 211 continuously monitor the state of the entities registered on their respective hosts. Each SE has many states and a state machine. If the SE changes state, it reports the state change to its MS. In some cases, MS may determine that SE changed state. If any of the software entities the MS oversees has changed its state, MS updates its own routing table and sends a new RIP message to its neighbor host to request an RIP table update with the new information. The change in the routing table enables each MS to route messages to appropriate SEs. The state change messages received by the MS from the SE may be relating to traffic processing capabilities. In addition to this functionality, based on the interest declared by the software entity, MAD informs each entity about the entity status changes taking place in the overall entity framework. Regardless of which host the software entity is running on, if a new entity is introduced into MAD framework, or if an entity becomes congested or inaccessible, such information is delivered to all interested entities to ensure that they take necessary actions to survive and continue to serve.

SERVICING: All communication between the entities running on the same host is performed over the queues created in the shared memory space of the native operating system of the host. All communication between the entities running on different hosts is performed over the TCP/IP connections established between those hosts. With reference to FIGS. 3 and 4, if entity 222 creates a message destined to entity 224, it writes this message to its output queue 900, messaging software 210 fetches this message, examines its destination label, decides that it is an intra-host communication, and writes it directly into the entity 224 input queue 901. Such communications between any pair of entities using messaging software on the same host is performed in a completely asynchronous manner. Meaning, each new message is treated independently and autonomously without needing to rely on any state information about any other messages processed prior to that message.

If entity 222 creates a message destined to entity 233, it writes this message to its output queue 900, messaging software 210 fetches this message, examines its destination label, decides that it is an inter-host communication, consults its RIP routing tables, finds the TCP/IP connection to host 102, and writes the message into the TCP/IP connection 400 output queue 902. This message is then sent to host 102 over TCP/IP connection 400 and messaging software 211 receives it for final delivery to entity 233. Queuing at all steps of messaging communication helps to improve real time performance, transient absorption, and define clear interfaces between functionally separable software components. Such communications between any pair of entities residing on two different hosts using messaging software is performed in a completely asynchronous manner. Meaning, each new message is treated independently and autonomously without needing to rely on any state information about any other messages processed prior to that message.

Figure 5:
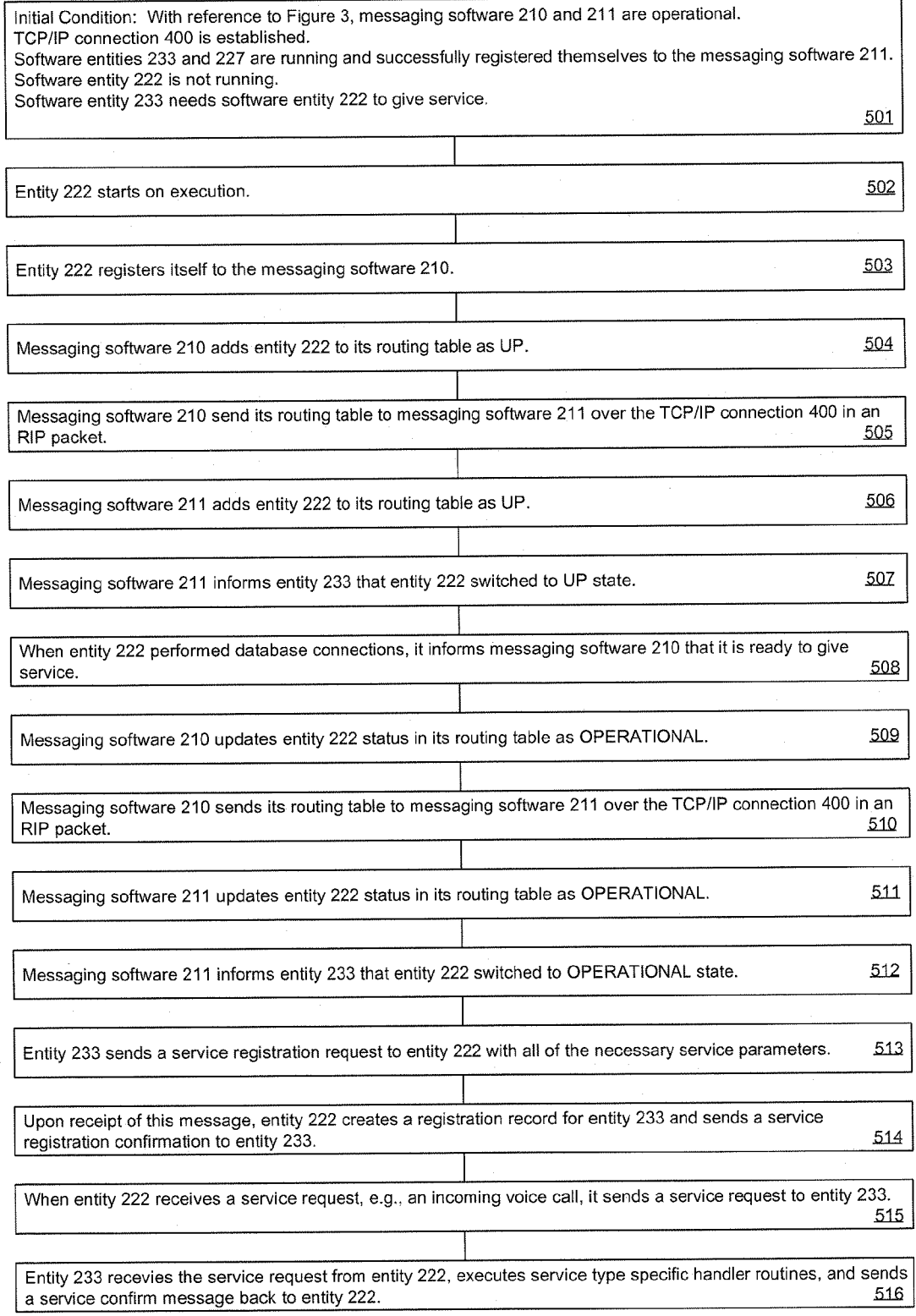
FIG. 5 illustrates an exemplary process of message handling scenario between three software entities on two hosts.

FIG. 5 describes steps for message handling of three software entities on two hosts. The system as per step 501 is in the initial state, wherein MS 210 and 211 are operational; the TCP/IP connection 400 is established; software entities 227 and 233 are running and have registered themselves to messaging software 211; software entity 222 is not running and software entity 233 needs software entity 222 to start providing service. Entity 222 starts execution in step 502. Entity 222 registers itself to the messaging software 210 in step 503. In step 504, messaging software 210 adds entity 222 to its routing table as UP. Messaging software 210 sends its routing table to messaging software 211 over the TCP/IP connection 400 in an RIP packet in step 505. In step 506, messaging software 211 adds entity 222 to its routing table as UP. Messaging software 211 informs entity 233 that entity 222 switched to UP state in step 507. When entity 222 performed database connections, it informs messaging software 210 that it is ready to provide service in step 508. In step 509, messaging software 210 updates entity 222 status in its routing table as OPERATIONAL. Messaging software 210 sends its routing table to messaging software 211 over the TCP/IP connection 400 in an RIP packet in step 510. In step 511, messaging software 211 updates entity 222 status in its routing table as OPERATIONAL. Messaging software 211 informs entity 233 that entity 222 switched to OPERATIONAL state in step 512. In step 513, entity 233 sends a service registration request to entity 222 with all of the necessary service parameters. Upon receipt of this message, entity 222 creates a registration record for entity 233 and sends a service registration confirmation to entity 233 in step 514. When entity 222 receives a service request, it sends a service request to entity 233 in step 515. Entity 233 receives the service request from entity 222, executes service type specific handler routines, and sends a service confirm message back to entity 222 in step 516.

In order to make MAD easily manageable and flexible, its predefined configuration data is kept to a bare minimum since one of the design pillars is to equip it with a "self-learning" feature. The only data the operator must administer is the IP addresses of the hardware hosts the system is running on. The rest of the data, such as the host on which the software entity is running, the status of those software entities, available communication paths to MAD hosts, the load sharing and redundancy policy data, etc., are dynamically generated and propagated to all hosts in the MAD framework. MAD manages routing information base and supports hello-like protocol for dynamic discovery. Doing so, MAD simplifies the addressing mechanism and annuls the restrictions on the establishment of the underlying IP Network. Furthermore, due to the usage of this dynamic software entity discovery and status exchange feature of MAD, traffic is uniformly distributed among the hosts in the framework. A host can takeover the traffic of another host in case of a failure or congestion. Those features have direct impact on the overall framework as increased robustness and redundancy even in worst conditions.

MAD is scalable in a nearly linear fashion. When a new host is inserted to the MAD framework, it connects to predefined adjacent platforms, fetches the most current software entity configuration data, and broadcasts its own entity information. Doing so, a new platform is immediately taken into service after a cold restart procedure and, since MAD supports dynamic load sharing, it starts accepting traffic in a very short period of time. This feature is specially designed to scale-up an existing product on the fly while it is under traffic.

CONCLUSION

A system and method has been shown in the above embodiments for the effective implementation of a method and apparatus for distributing software. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by specific software/program, computing environment, or computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of object-oriented programming.

What is claimed is:

1. A method facilitating communication between at least two hosts, each of said hosts comprising an application software component that is divided into software entities, said method comprising the steps of:

creating messages by a software entity on a first host of said at least two hosts destined for any of remaining of said at least two hosts and writing said messages into an output queue;

fetching said messages by a messaging software component on said first host;

deciding type of communication by said messaging software component;

if said communication is intra-host, writing said messages into an input queue of another software entity residing on said first host, and if said communication is inter-host, writing said messages into a connection output queue for said any of the remaining of at least two hosts that the messages are destined for in said first host, sending said messages by said messaging software component on said first host to a messaging software component on said any of the remaining of at least two hosts, receiving said messages by said messaging software component in said any of the remaining of at least two hosts and writing said messages into a connection input queue by said messaging software component and further writing said messages to an input queue of a software entity residing on said any of the remaining of at least two hosts, and said messages used in any of the following mechanisms: registration and deregistration mechanism, cold startup mechanism or a life cycle mechanism, said registration/deregistration mechanism used by each of said software entities on said at least two hosts to register/deregister themselves to/from said system, said registration/deregistration mechanism performing step of: registering said software entities residing on a first host with said messaging software component on said first host at startup; establishing for each of said registered software entities on said first host, input and output message queues in an inter-process shared memory, together with creating traffic dispatcher threads; distributing registration information on said first host to said remaining of said at least two hosts periodically by using a (Transmission Control Protocol/Internet Protocol) TCP/IP connection, and releasing said input and output queues in said inter-process shared memory when any of said registered software entities is no longer functional;

said cold startup mechanism further comprising: obtaining a list of software entities from remaining of said at least two hosts using a RIP protocol; constructing a list of software entities known to said first host including software entities registered locally to said first host and said list of software entities obtained from step above, and sending said constructed list to said remaining of said at least two hosts using said (routing information protocol) RIP protocol; and said lifecycle management mechanism used by messaging software component on said first host to monitor state software entities residing on said first host, said mechanism performing the steps of: associating a state with each of said software entities via a state machine; receiving state change messages from each of said software entities relating to traffic processing capabilities by said messaging software component on said first host, and updating a RIP routing table stored in said messaging software component on said first host and sending said table to each of said remaining at least two hosts via said messaging software component.

2. A method facilitating communication between at least two hosts, according to claim 1, wherein said messages are serviced in an asynchronous manner.

3. A method facilitating communication between at least two hosts, according to claim 1, wherein said messages are RIP messages or open shortest path forwarding (OSPF) messages.

4. A method facilitating communication between at least two hosts, according to claim 1, wherein said messages comprise a list of software entities and their states known to a host sending said messages.

5. A method facilitating communication between at least two hosts, according to claim 1, wherein said intra-host communication is via inter-process shared memory.

6. A method facilitating communication between at least two hosts, according to claim 1, wherein said inter-host communication is via an IP socket connection using TCP protocol.

7. A method facilitating communication between at least two hosts, according to claim 1, wherein said output/input connection queue is TCP output/input connection queue.

8. A method facilitating communication between at least two hosts, according to claim 1, wherein said messaging software component on said first host or on said remaining of at least two hosts detects insertion or deletion of hosts in the system.

9. A method facilitating communication between at least two hosts, according to claim 1, wherein each of said remaining at least two hosts also perform the same steps upon cold startup.

10. A method facilitating communication between at least two hosts, according to claim 1, wherein said messaging software components on each of said remaining at least two hosts monitor the states of software entities residing on said remaining at least two hosts using the same steps of said lifecycle management mechanism.

11. A method facilitating communication between at least two hosts, according to claim 1, wherein said messaging software component on said first host may also determine state changes in each of said software entities instead of said software entities sending said state change messages to said messaging software component.

12. A method facilitating communication between at least two hosts, according to claim 1, wherein said state change messages are distributed by said messaging software component to software entities on said remaining of at least two hosts based on expressed interest by said software entities at the time of registration to receive said messages from any of the first set of software entities whose state has changed.

* * * * *